United States Patent [19]

La Hue et al.

[11] 3,935,295

[45] Jan. 27, 1976

[54] PROCESS FOR REMOVING CHLORINE-CONTAINING COMPOUNDS FROM HYDROCARBON STREAMS

[75] Inventors: Richard W. La Hue; Cecil B. Hogg, both of Louisville, Ky.

[73] Assignee: Catalysts and Chemicals, Inc., Louisville, Ky.

[22] Filed: Jan. 23, 1973

[21] Appl. No.: 326,011

[52] U.S. Cl. ............... 423/240; 208/226; 208/262; 423/230
[51] Int. Cl.² ............................................. C01B 7/00
[58] Field of Search .......... 208/106, 247, 226, 262; 423/240, 230, 481; 252/457, 475

[56] References Cited
UNITED STATES PATENTS

| | | | |
|---|---|---|---|
| 2,413,871 | 1/1947 | Hepp | 208/262 |
| 2,481,300 | 9/1949 | Engel | 208/226 |
| 2,959,538 | 11/1960 | Weikart et al. | 208/247 |
| 3,063,936 | 11/1962 | Pearce et al. | 208/247 |
| 3,278,266 | 10/1966 | Welch et al. | 423/240 |
| 3,305,587 | 2/1967 | Sperbert et al. | 252/475 |
| 3,441,370 | 4/1969 | Gutmann et al. | 423/244 |

FOREIGN PATENTS OR APPLICATIONS

| | | | |
|---|---|---|---|
| 1,266,908 | 6/1968 | Germany | 208/226 |

OTHER PUBLICATIONS

Harshaw Catalysts Catalog – 1972 – p. 25.

*Primary Examiner*—Oscar R. Vertiz
*Assistant Examiner*—Eugene T. Wheelock
*Attorney, Agent, or Firm*—Wm. R. Price

[57] ABSTRACT

Hydrotreating of normally liquid hydrocarbon feeds has long been practiced to convert organic sulfur compounds to hydrogen sulfide for subsequent removal by adsorption. It has now been found that hydrotreating of said feed stocks over a nickel molybdenum oxide or cobalt molybdenum oxide catalyst also converts trace quantities of organic chloride compound to HCl which not only is a poison for catalysts in subsequent reactions but seriously reduces the sulfur retention capacity of zinc oxide sulfur adsorbents. A solid chloride adsorbent having a chloride retention capacity some twentyfold greater than known adsorbents has been developed for the sequential removal of hydrogen chloride contaminants in trace quantities to a level of less than one part per million in hydrogen treated streams. This adsorbent serves as a guard for catalysts in subsequent catalytic processes as well as a guard for the solid sulfur adsorbent utilized immediately downstream therefrom.

7 Claims, 2 Drawing Figures

PROCESS FOR REMOVING CHLORINE-CONTAINING COMPOUNDS FROM HYDROCARBON STREAMS

FIELD OF THE INVENTION

This invention involves a solid chloride adsorbent which completely removes the chloride contaminants from various hydrocarbon containing fluid streams and especially from normally liquid hydrocarbon streams such as naphtha feed stocks. It has been found that treating of naphtha or other normally liquid hydrocarbons with hydrogen over a cobalt molybdenum oxide catalyst to convert organic sulfur compounds to hydrogen sulfide also converts organic chloride compounds to hydrogen chloride. The hydrogen chloride thus generated serves as a poison not only for the catalyst located downstream but seriously reduces the sulfur adsorption capacity of zinc oxide solid adsorbents normally used to protect said catalyst from hydrogen sulfide contamination. The adsorbent of this invention has a chloride adsorption capacity of from ten to twenty times that of any presently known chloride adsorbent. Further, it is active for the simultaneous removal of HCl and $H_2S$ from various process gases. This invention relates, therefore, to a chloride adsorbent; to a process of utilizing said chloride adsorbent in removing hydrogen chloride from hydrocarbon containing feed streams as well as a method of converting organic chloride and sulfur compounds to hydrogen chloride and hydrogen sulfide for sequential removal through beds of chloride and sulfur adsorbents.

BACKGROUND OF THE INVENTION

Chloride compounds have been recognized for some time as serious poisons to many catalytic reactions. Such chloride contamination, however, previously has been from sources other than the hydrocarbon feed to plants used to make products such as hydrogen and ammonia. Several factors have recently required the use of heavier, normally liquid type hydrocarbon feeds to these plants which previously were designed for the most part to use normally gaseous natural gas type feeds consisting primarily of methane. Such natural gas feeds contain little, if any, chloride compounds. Further, due to the serious shortage of natural gas, used for heating and commercial installations, synthetic natural gas plants are now in the design or construction stage as replacements for the dwindling natural gas supplies. These so called SNG (synthetic natural gas) plants are being designed to use primarily naphtha type hydrocarbon feeds which are converted in these plants to natural gas type fuel, consisting of high concentrations of methane. Many of these naphtha feeds contain relatively high levels of chloride compounds, as well as high levels of sulfur compounds, both of which, if not essentially completely removed, result in serious poisoning of all other catalysts in SNG plants. Further, many plants presently operating, such as those for making hydrogen and ammonia, were originally designed to use a natural gas feed and will have to be modified so that a heavier type feed stock can be used. It has been found that high surface area zinc oxide sulfur adsorbents have low capacity for removal of chlorides. This capacity is, in fact, in the range of from 0.25 to 1.0 wt. percent chloride retention of the entire adsorbent mass, based on chloride leakage or breakthrough of one part per million or less. Since these adsorbents are not regenerative, such a low chloride retention level is commercially unfeasible. Further, it has been found that chlorides in trace quantities in the feed stocks seriously reduce the sulfur retention capacity of the commercially available high surface area zinc oxide sulfur adsorbents. Therefore, chloride contaminants in the hydrogen treated feed stocks not only act as poisons for the downstream catalysts of SNG, hydrogen and ammonia plants, but act as poisons for the sulfur adsorbents used as a guard for such catalysts.

SUMMARY OF THE INVENTION

According to this invention, basic compounds of calcium utilized in conjunction with zinc oxide and an inert binder produce an excellent adsorbent for the essentially complete removal of hydrogen chloride from hydrocarbon containing fluid streams. We have found that adsorbents containing these constituents have a chloride retention capacity of ten to twenty times that of the commercial solid adsorbents presently in use. We have found further, that these adsorbents are active for chloride adsorption at pressures in excess of atmospheric and at temperatures in the range of from 300° to 1000°F. Further, we have found that the conversion of organic sulfur compounds in hydrocarbon feed stocks through reaction with hydrogen over a hydrotreating catalyst also converts the organic chloride compounds to hydrogen chloride which acts as a poison for subsequent catalytic reactions and acts to reduce the sulfur retention capacity of the highly active, highly adsorbent, high surface area zinc oxide sulfur adsorbents. Hydrotreating catalysts are recognized in the art as comprising nickel and oxides of molybdenum or cobalt and the oxides of molybdenum supported on an aluminous support, which has a high surface area. Since these sulfur adsorbents are non-regenerative and are discarded as soon as a breakthrough of sulfur occurs, a reduction in capacity is highly serious. The elements calcium, strontium and barium have among the highest heats of formation for reaction with halides of any of the elements and therefore, it is hypothesized that this is a reason for their exceptional chloride adsorption retention capacity. In any event, we have demonstrated that a solid adsorbent, comprising a basic compound, such as the hydroxide of a Group II A metal such as calcium in admixture with zinc oxide and an inert binder exhibits a retention capacity for chlorides of ten to twentyfold greater than the retention capacity for chlorides of commercial zinc oxide sulfur adsorbents. Further, removal of chloride contaminants from the industrial fluid stream prior to passing said contaminant through a bed of solid sulfur adsorbent prevents loss of sulfide retention capacity of said adsorbent bed. Further, although hydrogen sulfide reduces the chloride retention capacity of the solid chloride adsorbent, hydrogen sulfide does not release chlorides adsorbed by the said chloride adsorbent even after chloride breakthrough has occurred from the saturated chloride adsorbent.

BRIEF DESCRIPTION OF THE DRAWINGS

Referring now to the drawings.

DETAILED DESCRIPTION OF THE PREFERRED EMBODIMENT

Figure 1:
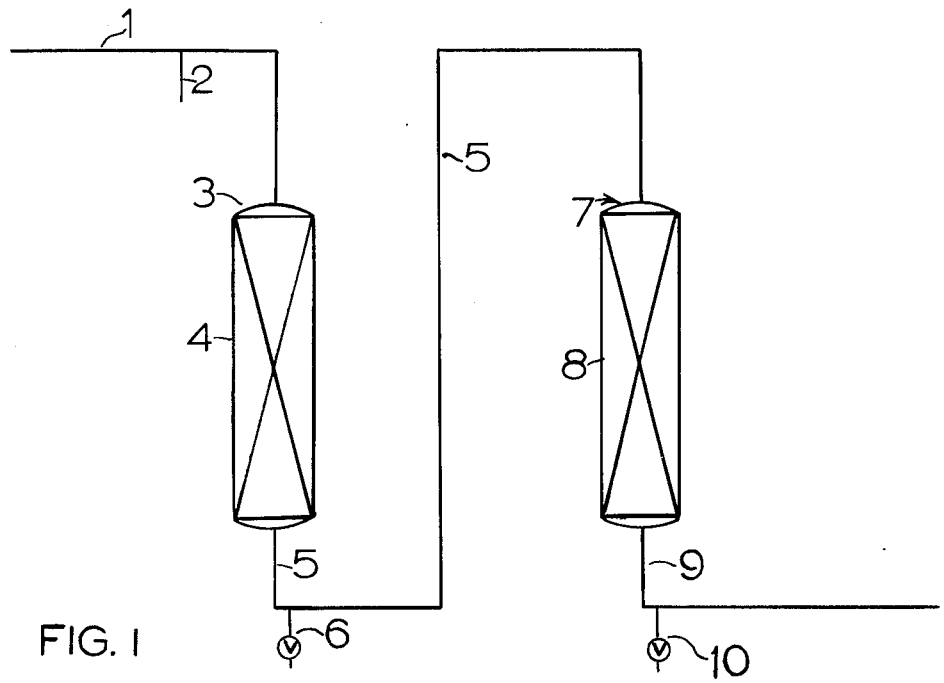
FIG. 1 is a flow diagram, illustrating diagrammatically the test apparatus described herein; and, FIG. 2 is an enlarged diagrammatic representation of the adsorbent vessel containing an adsorbent bed in which the upper portion consists of the solid chloride adsorbent of this invention while the lower portion consists of a solid sulfur adsorbent.

As previously indicated, some naphtha feed stocks contain an appreciable quantity of organic chloride compounds. Further, various off gases derived from various refinery processes, which can be used because of the high relative hydrogen and methane concentration, may also contain chlorine compounds and possibly sulfur compounds. Conversion of the organic sulfur compounds to hydrogen sulfide over cobalt and molybdenum oxide or nickel and molybdenum oxide catalysts is well known in the art.

What was not so well known in the art was that the same process converted organic chloride compounds to hydrogen chloride. Therefore, the development of an improved adsorbent active for removal of chloride compounds from various feed streams to a level of less than 1 part per million became necessary. Since chloride adsorbents are unregenerative, a chloride retention capacity in excess of 5 percent by weight of the adsorbent was deemed essential for commercial application.

TEST PROCEDURE

While the process may be operated at pressures above atmospheric and temperatures in the range of from 300°–1000° F., the identical test procedure was used throughout except for addition of hydrogen sulfide in the examples indicated. Chlorides were removed to a level of 1 ppm weight (the level of detectibility of the analytical method utilized). A level in excess of 1 ppm was considered a breakthrough of chlorides. A leakage of sulfur in excess of 0.2 ppm weight was considered a breakthrough of sulfur. A synthetic naphtha feed stock was made up comprising: 80 percent by weight hexane, 10 percent by weight benzene and 10 percent by weight cyclohexane. Chloride contamination was provided by introducing carbon tetrachloride ($CCl_4$) in an amount equivalent to 40–60 ppm weight of the total feed. Sulfur contamination was effected by adding $H_2S$ in an amount equivalent to about 500–600 ppm weight of the total feed. Since normal naphtha feed stocks contain a level of chloride contamination of about 1–10 ppm weight all of these tests were accelerated and reflect a shorter life than has been experienced with naturally occurring naphtha feedstocks.

Since the exact significant of chloride on the sulfur adsorbents, and the exact significance of sulfur on the chloride adsorbents or the significance of both components on either of the adsorbents was not fully appreciated, the initial naphtha feed stock was absolutely sulfur free. This procedure with the sulfur free stock was set up as though the chloride adsorbent would be located in series following the sulfur adsorbent.

The naphtha feed, contaminated with 40 to 60 parts per million weight chlorides in the form of carbon tetrachloride ($CCl_4$) was passed over a hydrotreating catalyst located in reactor 3 at a temperature of 700° F. and at a pressure of 500 psig so as to convert the carbon tetrachloride ($CCl_4$) to hydrogen chloride (HCl). The hydrotreated naphtha was then passed via line 5 to the adsorbent vessel at the same process conditions, viz:

| | |
|---|---|
| PRESSURE | 500 psig |
| TEMPERATURE | 700 degrees F. |
| SPACE VELOCITY | 1300 V/V/hr. (gaseous) |
| MOLE % $H_2$ | 10% |
| CHLORIDE ADSORBENT | 15 cc. meshed 10 × 16 |
| CHLORIDE LEVEL IN NAPHTHA FEED | 40–60 ppm |

Figure 2:
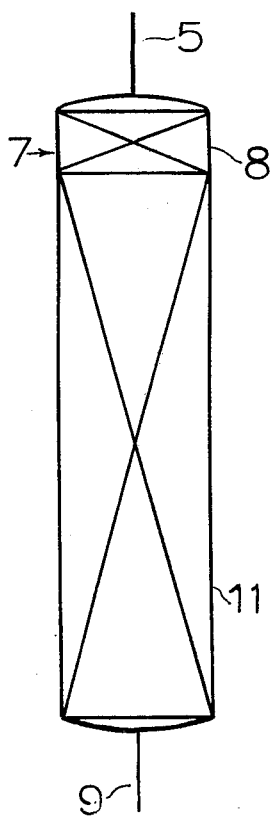

The naphtha feed was fed through line 1 and hydrogen was introduced from line 2. The hydrogen and naphtha feed entered the reactor 3 through line 1. The reactor contained 15 cc. of CCI's C20-7 catalyst. This catalyst consists of nickel and molybdenum oxides on activated alumina. The hydrogen treated feed was passed through line 5 and inlet samples were drawn off daily through sample point 6. The hydrogen treated effluent was fed through line 5 to reactor 7, which was loaded with a chloride adsorbent in bed 8. The effluent from vessel 7 was led through outlet 9 and outlet samples were taken daily through sample point 10. The inlet sample taken from sample point 6 clearly indicated the ppm wt. of chloride entering reactor 7 and was analyzed daily by a test method hereinafter set forth. The limit of detectibility of this test method is 1 ppm chloride. When this liquid hydrocarbon feed also contains sulfur, as hydrogen sulfide, the limit of detectibility of the sulfur was less than 0.2 ppm wt. Sulfur was added as $H_2S$ to this simulated feed naphtha at levels of about 500 ppm wt. at a gaseous space velocity of 1300V/V/hr. This approximates a portion 8 of an adsorbent bed, loaded to 10 percent of its total capacity with the solid chloride adsorbent and a lower portion 11, loaded to 90 percent by volume with a sulfur adsorbent as illustrated in FIG. 2. The normal space velocity for a high surface area zinc oxide sulfur adsorbent, such as CCI's C7-2 (described in U.S. Pat. No. 3,441,370) is normally in the range of from 150–1500. Since a breakthrough of HCl or of $H_2S$ in either of the absorbent beds 8 or 11 would necessitate discarding both beds, the beds are loaded so as to reach saturation almost simultaneously. Thus the size of the bed is predicated on the amount of the contaminant in the feed stock and the retention capacity of the absorbents for chlorides and sulfides respectively. An additional chloride absorbent vessel in series in the system may be added, but this requires additional capital expenditure, additional space and additional shut down time for engineering, fabrication and installation.

Analytical Methods

The analytical methods used for chloride and sulfur are as follows: The chlorides in and out of the reactor through sample points 6 and 10 respectively were measured by bubbling the process gas through a condensor and then through a 1 percent caustic solution for a specified time and at a constant rate. The liquid naphtha was collected in the bubbler, and the ppm of chloride was determined by an Orion Specific Chloride Ion Meter, model 407, having a detectibility limit of 1 ppm Cl by weight. Sulfur was determined by bubbling the process gas through sulfuric acid to remove any chloride, then the gas was passed through a cadmium nitrate scrubber for a specified time and at a specified rate. The concentration in ppm weight was determined by titrating with sodium hydroxide with methyl orange indicator. The limit of detectibility for sulfur was 0.2 ppm by weight.

The chloride content was determined by boiling a known sample weight of the used absorbent in deionized water and determining the chloride concentration in the water after cooling by analysis using the Orion Chloride Ion Meter. The sulfur content of the used absorbent was determined by a Leco Sulfur Analyzer.

EXAMPLE 1

A batch of the absorbent of this invention was prepared as follows: 26.5 lbs. of hydrated lime and 53.5 lbs. of zinc oxides were dry mixed with 20 lbs. of powdered clay for ten minutes. The zinc oxides were derived by the thermal decomposition of zinc carbonate which in turn was precipitated by the controlled thermal decomposition of a solution of zinc ammine carbonate $Zn(NH_3)_4CO_3$ through the release of $NH_3$. The resulting zinc oxides obtained by calcining the zinc carbonate at 700° F. had a surface area in the range of from 40 to 70 $m^2$/gm.

About 35 lbs. of water were slowly added to the mixture with constant wet mixing for ten minutes. The water was added at such a rate as to keep the temperature rise of the wet mix below 15° F. When the wet mixed materials were of extrudable consistency, the mix was extruded into 3/16 inch pellets. These were dried at 700° F. and screened.

Now referring to FIG. 1, these dried pellets were sized to 10 × 16 mesh and 15 cc. of the sized material were loaded into an absorbent vessel 7 to form an absorbent bed 8. The absorbent contained on a nominal basis, 20 percent of calcium oxide, 53 percent of zinc oxide and 20 percent by weight of clay. This apparent discrepancy of the total weight equalling less than 100 percent is due to the hydroxide group of calcium hydroxide not being accounted for. All of these percentages were expressed as percentages of the weight of the total mixture. The absorbent had a surface area of 32 $m^2$/gm and a pore volume in cc/gm of 0.2-0.3 greater than 29 angstroms. A first reactor 3 connected in series with said absorbent vessel was loaded with 15 cc. of 10 × 16 mesh particles of a commercial hydrotreating catalyst sold by Catalysts & Chemicals, Inc. This catalyst, known as C20-7, contains nickel oxide in a percentage by weight of 3.8 and molybdenum oxide in a concentration by weight of 14.1 percent on an alumina support. It has a surface area of 150 $m^2$/gm. This material formed a catalyst bed 4 in the catalyst reactor 3. Inlet and outlet samples for the chloride absorbent vessel 7 were collected through sample points 6 and 10 daily and analyzed. The gas inlet contained between 40-60 ppm weight chlorides and no sulfur. The outlet gas collected contained less than 1 ppm weight of chlorides throughout the run. At the end of 781 hours (33 days), breakthrough occurred and 15 ppm weight chlorides were found in the outlet sample. The adsorbent was analyzed with samples taken from the top one-third of the adsorbent bed 8, the middle of the bed 8 and the bottom one-third of the bed. These analyses show the following.

| Sample | % by Wt. Chloride |
| --- | --- |
| Top | 36.7 |
| Middle | 28.1 |
| Bottom | 6.1 |
| Average | 23.6 |

This run proved that the adsorbent of this invention would operate with essentially complete removal (down to less than 1 ppm weight of chlorides) for over a month. This test was with an unusually large concentration of chloride so as to accelerate the point of saturation at a level of greater than 1 ppm leakage of chlorides. Most feed stocks contain chlorides at a level of 1–10 ppm weight and therefore a much longer life of the adsorbent can be anticipated. The chloride retention was such that the absorbent collected in excess of 23 weight % of chlorides. This adsorbent is not regenerated and must be discarded once it has reached saturation. Nevertheless, this run indicated that the chloride absorbent was adequate for commercial application since a chloride retention of even 5 percent by weight would be commercially acceptable.

EXAMPLE 2

This run was made with an adsorbent from a different batch but made by the same procedure as Example 1. This adsorbent removed all the chlorides from the hydrogen treated naphtha feed (40–60 ppm weight chlorides) to less than 1 ppm weight in the outlet for a total of 740 hours. This amounts to 32 days. At that time, a breakthrough of 14.6 ppm. weight chloride occurred.

At this time a simulated naphtha feed without chloride contamination was passed through this adsorbent for 46 hours, and less than 1 ppm of chloride was found in the outlet sample taken from sample points 6 and 10. The following day, 500 ppm of $H_2S$ was introduced (still without chlorides) and 3–10 ppm chloride were found in the inlet samples taken from sample point 6. The 3–10 ppm of chlorides actually analyzed in the inlet samples apparently came from the catalyst contained in catalyst bed 4 since no chlorides were being fed into the reactor 3. The outlet samples taken through sample point 10 contained from 2–3.5 ppm of chlorides. This is interesting, since even the spent adsorbent, chlorides purged from the catalyst bed 4 were still reduced almost in half in the outlet. Sulfur was adsorbed with the spent adsorbent (in reference to chloride retention) for 40 hours after which a breakthrough of $H_2S$ occurred. It is significant, however, that sulfur introduced as $H_2S$ into the catalyst bed 4 and throughout the lines into adsorbent bed 8 did not release large quantities of chlorides. Sulfur leakage was less than 1 ppm for 40 hours even with the spent chloride adsorbent, and the chlorides in the outlet were less than the chlorides in the inlet for the entire period. Analysis of the chloride adsorbents after the aforementioned procedures:

| Sample | % by Wt. CHLORIDE | % by Wt. SULFUR |
| --- | --- | --- |
| Top ⅓ | 24.3 | 10.3 |
| Middle ⅓ | 22.6 | 8.2 |
| Bottom ⅓ | 13.7 | 4.0 |
| Average | 20.2 | 7.5 |

These two runs indicated that the adsorbent of this invention containing a calcium compound equivalent to 20 percent calcium oxide will effectively remove chlorides to a level of less than 1 ppm until chloride breakthrough and allow chloride retention of greater than 20 percent by weight of the adsorbent. These tests were run with no sulfur in the feed, at least initially, and would simulate the use of the adsorbent below the zinc oxide sulfur adsorbent forming a bed 11 in the adsorbent reactor 7, as illustrated in FIG. 2. It was also demonstrated that the sulfur capacity of this chloride adsorbent, after chloride saturation of 20.2 percent, is 7.5 percent sulfur. Without chloride saturation, the sulfur retention would be expected to be around 12 percent. The introduction of $H_2S$ into the saturated chloride absorbent does not release chlorides from the adsorbent.

EXAMPLE 3

As a comparison with the chloride retention of this adsorbent, a sample of a commercial zinc oxide sulfur adsorbent, produced by Catalysts & Chemicals, Inc., and known as C7-2, was sized to 10 × 16 mesh size. This adsorbent contains 80 percent zinc oxide and 20 percent clay. The surface area of this adsorbent is in the range of 30–50 $m^2/gm$. Testing this adsorbent under the same conditions previously indicated, without hydrogen sulfide in the stream, chlorides were removed to a level of less than 1 ppm weight for 3 days. Between the 3rd and 4th days, a chloride breakthrough of 52 ppm weight occurred. Analysis of the adsorbent was as follows:

| Sample | % by Wt. CHLORIDE |
| --- | --- |
| Top | 1.96 |
| Middle | .89 |
| Bottom | .17 |
| Average | .96 |

The life of this adsorbent was about one-tenth of the life of the adsorbents of Examples 1 and 2. The chloride retention capacity was less than one-twentyth of the capacity of the adsorbent of Examples 1 and 2.

EXAMPLE 4

To determine if chlorides increase sulfur leakage from the commercial sulfur adsorbent, a test was started and operated for 44 hours utilizing the C7-2 adsorbent produced by Catalysts & Chemicals, Inc., and described in Example 3. Initially, a test was operated with no chlorides in the inlet and with 500–600 ppm weight of sulfur in the form of $H_2S$ in the naphtha feed. It was verified from the daily outlet samples taken from sample point 10 that for a period of 44 hours, the outlet leakage of sulfur was less than 0.2 ppm. weight. Chlorides were then injected into the feed. After the 68th hour (22 hours after injection of chlorides) sulfur leakage had reached 17 ppm weight. At sulfur breakthrough, the calculated sulfur pickup or retention was only 15.4 weight %. Normal sulfur pickup for the C7-2 adsorbent in the absence of chlorides has been established at about 24–26%. This amounts then to a decrease in sulfur retention capacity in excess of 35 percent over that experienced without chlorides. The adsorbent was then analyzed.

| Sample | % by Wt. SULFUR | % by Wt. CHLORIDE |
| --- | --- | --- |
| Top | 19.8 | .30 |
| Middle | 14.7 | .26 |
| Bottom | 11.6 | .27 |
| Average | 15.4 | .28 |

Another run was made utilizing the C7-2 adsorbent and utilizing the simulated naphtha feed containing 500–600 ppm weight $H_2S$. The level of chloride contamination was incrementally increased during the run. During the first day, the chloride level was 10–15 ppm weight HCl. The sulfur leakage was less than 0.2 ppm weight and the chloride leakage was less than 1 ppm. weight. On the second day, the chloride inlet level was increased to 30 ppm and a sulfur breakthrough of 0.6 ppm weight occurred, as well as a chloride breakthrough of 8 ppm weight. The test was continued with the same level of chloride and sulfide contaminants. On the fourth day, the inlet chloride was 26 ppm weight and the outlet chloride was 22 ppm weight. The sulfur leakage had increased to 32 ppm weight. This adsorbent was not analyzed for chlorides. The average analysis for sulfur, however, was 14.8 weight %. These experiments proved conclusively that chlorides in the feed have a deleterious effect on the sulfide retention of the sulfur adsorbent. Further, these tests showed that commercial sulfur adsorbents have a very poor retention for chlorides.

EXAMPLE 5

Another test of the adsorbent prepared according to Example 1 of this invention was tested under standard operating conditions with 500–600 ppm weight sulfur and 40–60 ppm weight chlorides injected into the stream. This adsorbent removed all the chlorides to a level of less than 1 ppm weight for a period of 15 days. Chloride breakthrough occurred on the 16th day. Sulfur broke through at 65 hours on stream. Analysis of the spent adsorbent after the 15 plus days on stream was as follows:

| Sample | % by Wt. CHLO-RIDE | % by Wt. SULFUR |
| --- | --- | --- |
| Top | 11.3 | 15.6 |
| Middle | 10.4 | 14.1 |
| Bottom | 8.9 | 14.3 |
| Average | 10.2 | 14.6 |

The chloride retention of this spent chloride adsorbent on analysis was 10.2 percent by weight and the sulfur retention was 14.6 percent by weight. The sulfur capacity of commercial zinc oxide type sulfur adsorbents, without chlorides in the naphtha feed, has been established as ranging from 24 to 26 percent by weight, whereas the sulfur retention of this Example 5 adsorbent (invention) is about 14 percent by weight. This is due primarily to its lower zinc oxide content, i.e. about 53 percent zinc oxide versus the 80 to 90 percent zinc oxide level in such commercial sulfur adsorbents. Further, this run demonstrates that sulfur contamination in such a hydrocarbon stream lowers the chloride retention capacity of this invention. This is shown by comparing this chloride adsorption capacity to that of Examples 1 and 2.

EXAMPLE 6

A batch of the adsorbent of this invention was prepared as follows: 56.8 lbs. of hydrated lime, 25.9 lbs of zinc oxide and 17.3 lbs of clay were dry mixed. The zinc oxides were prepared according to the steps set forth by Example 1. The resulting composition had a nominal composition of 43 percent calcium oxide (present as $Ca(OH)_2$); 17 percent clay and 26 percent zinc oxides. The dried extrudates had a surface area of 23 m²/gm; a pore volume of 0.2–0.3 cc/gm of pores having diameters greater than 29 angstroms. The extruded pellets were sized to a 10 × 16 mesh size and loaded into the adsorbent vessel 7 to form adsorbent bed 8 of FIG. 1. The material was tested under the standard conditions with the synthetic naphtha contaminated with chlorides in the form of carbon tetrachloride in the range of 40–60 ppm and with sulfur in the form of $H_2S$ in concentrations of 500–600 ppm. This adsorbent removed all chlorides to less than 1 ppm in the effluent for 27 days. Sulfur broke through after 2 days. Analysis of the adsorbent after conclusion showed the following:

| Sample  | % by Wt. CHLORIDE | % by Wt. SULFUR |
|---------|-------------------|-----------------|
| Top     | 29.9              | 5.1             |
| Middle  | 23.1              | 7.7             |
| Bottom  | 9.85              | 8.8             |
| Average | 20.95             | 7.2             |

This run shows that increasing the calcium oxide from about 20 to about 40 percent increases the chloride retention from 10 weight % (in the presence of sulfur compounds) to about 20 weight % under the same conditions. The sulfur pickup is reduced due to the low zinc content of this material. The calcium constituent removes little, if any, $H_2S$ under these conditions. The sulfur profile is of some interest because the most sulfur appears to be picked up at the bottom of the bed rather than at the top. This may indicate that the bottom portion of the sulfur adsorbent is protected from chlorides for a longer period than the top. Possibly, it may indicate that the overall capacity of the adsorbent for sulfur is reduced depending on its chloride content, either in the gas stream or on the adsorbent itself. The chloride profile of the adsorbent indicates good distribution of chloride pickup throughout the adsorbent bed. The results of these various runs are tabulated in tables A and B in which it is shown that the zinc oxide adsorbent has a very low capacity for chloride adsorption in the range of less than 1 weight % of the adsorbent. Addition of calcium hydroxide or other basic calcium compounds in weight concentrations of 20 percent produces a twentyfold increase in chloride retention so that the adsorbent will adsorb and retain in excess of 20 percent of its weight in chloride. Sulfur has an adverse effect on the retention of chlorides in the chloride adsorbents and chlorides have an adverse effect on the retention of sulfur in the zinc oxide adsorbents. The space velocity of the chloride adsorbents can be increased almost ten fold over the space velocity of the sulfur adsorbents if the adsorbents are loaded in the same bed. In other words, for each 100 cubic feet of total adsorbents, there would be about 10 cubic feet of chloride adsorbent along with about 90 cubic feet of sulfur adsorbent. It is possible of course, to use two reactors in the event of breakthrough of chloride or of sulfur occurs in one adsorbent over the other. Since these adsorbents are non-regenerative, it is, of course, necessary to dump the adsorbents as soon as breakthrough of one of the poisons occurs.

TABLE A

Standard Capacity Tests with Sulfur Free Synthetic Naphtha Containing 40–60 ppm Weight Chlorides

| Example | Adsorbent | Days On Stream* | Average Chloride Retention Wt. % | Average Sulfur Retention Wt. % |
|---------|-----------|-----------------|----------------------------------|--------------------------------|
| 1       | 20% CaO 53 lbs. ZnO 20% Clay | 33 | 23.6 | — |
| 2       | Same as 1 | 31 | 20.2 | — |
| 3       | CCl C7-2 80% Zno 20% Clay | 3 | .96 | — |

*Days on stream until greater than 1 ppm chloride broke through.

TABLE B

Standard Capacity Tests with Synthetic Naphtha Containing 40–60 ppm Weight Chlorides and 500–600 ppm Weight Sulfur

| Example | Adsorbent | Days On Stream* | Average Chloride Retention Wt. % | Average Sulfur Retention Wt. % |
|---------|-----------|-----------------|----------------------------------|--------------------------------|
| 4       | CCl C7-2 80% ZnO 20% Clay | 3 | .28 | 15.4 |
|         | Same | 2 | — | 14.8 |
| 5       | 20% CaO 53% ZnO 20% Clay | 16 | 10.2 | 14.6 |
| 6       | 43% CaO 26% ZnO 20% Clay | 27 | 20.95 | 7.2 |

*Days on stream until greater than 1 ppm chloride broke through.

The data clearly show that increasing the calcium oxide concentration of the adsorbent to 43 percent effectively doubles the chloride retention in the presence of sulfur. Experimental work has shown that as little as 7 percent of calcium oxide added to the zinc oxide adsorbent increases the capacity of the adsorbent for chlorides to 3 percent by weight. This is an appreciable overall increase in chloride retention capicibility over the chloride retention of about 0.5 percent by weight for the commercial zinc oxide sulfur adsorbent. This amounts to about a sixfold increase in chloride pickup. The discovery that chloride contamination was deleterious not only to subsequent catalysts but to the sulfur adsorbent, dictates that the chloride be removed from the treated stream prior to passage of the stream through the sulfur adsorbent. Prior to the invention, it was not clear whether the sulfur should be removed first, or whether the chloride should be removed first. In fact, the full effect of the various constituents on each other and on subsequent catalytic operations was not fully understood. In any event, this invention clearly establishes that the sequence of events should be treatment of the industrial feed stock with hydrogen over a hydrotreating catalyst to convert the organic sulfur compounds and the organic chloride compounds to H₂S and HCl respectively; and the sequential removal of the hydrogen chloride and of the hydrogen sulfide through their respective adsorbents prior to passing the treated materials on to further processing. While some emphasis has been given to naphtha feed stocks, it is apparent, of course, that this invention is applicable to other feed materials which contain chlorides, sulfur and sulfur compounds or chloride compounds along. An example of the latter might be the off gas from a so-called platforming reaction which is free of sulfur compounds but which does contain chloride contaminants in trace amounts. Further, the invention is operative at pressures in excess of atmospheric and temperatures in the range of from 300° F. – 1000° F.

Many modifications will occur to those skilled in the art from the detailed description hereinabove given and this description is meant to be exemplary in nature and nonlimiting except so as to be commensurate in scope with the appended claims.

we claim:

1. A process for removing hydrogen chloride from a hydrocarbon containing fluid stream which comprises the steps of:
   A. passing said fluid stream at a temperature in the range of from 300°F. to 1000°F., through a bed of dried and discrete adsorbent particles, consisting essentially of the following constituents:
      1. zinc oxide in a concentration of at lest 10 percent by dry weight of said mixture,
      2. a basic compound of calcium in a concentration by dry weight of said mixture of between 5 and 80 percent, and,
      3. an inert binder present in a concentration by dry weight of said mixtures of between 5 and 25 percent.

2. A process, as defined in claim 1, in which the surface area of said adsorbent is in the range of from 20 to 50 m²/gm.

3. A process for removing organic chloride compounds from a hydrocarbon containing fluid stream substantially free of sulfur bearing compounds which comprises the steps of:
   A. converting said organic chloride to hydrogen chloride by passing said hydrocarbon containing fluid stream in the presence of hydrogen over a catalyst comprising cobalt or nickel in association with the oxides of molybdenum and a solid support, at a temperature in excess of 300° F. and at a pressure in excess of atmospheric; and,
   B. passing the hydrogen treated effluent at a temperature not in excess of 1000° F. through a bed of solid chloride adsorbent consisting essentially of a mixture of zinc oxide, a basic compound of calcium and an inert binder.

4. A process, as defined in claim 3, in which said solid chloride adsorbent consist essentially of a mixture of:
   A. zinc oxide in a concentration of at least 10 percent by weight of said mixture,
   B. a basic compound of calcium in a concentration by weight of said mixture of between 5 and 80 percent, and,
   C. an inert binder, present in a concentration by weight of said mixture of between 5 and 25 percent.

5. A process, as defined in claim 3, in which said solid chloride adsorbent has a surface area in the range of from 20 to 50 m²/gm.

6. A process of removing organic sulfur compounds and organic chloride compounds from a hydrocarbon containing fluid stream, which comprises the steps of:
   A. converting said organic sulfur compounds to hydrogen sulfide and said organic chloride compounds to hydrogen chloride by passing said fluid stream in the presence of hydrogen over a catalyst comprising cobalt or nickel in association with the oxides of molybdenum and a support at a pressure in excess of atmospheric and a temperature in excess of 300° F.;
   B. removing the hydrogen chloride and a portion of said hydrogen sulfide by passing said treated fluid stream at a temperature in excess of 300° F. through a bed of solid chloride adsorbent comprising a mixture of zinc oxide, a basic compound of calcium and an inert binder, said basic compound of calcium being present in a weight percent, expressed as calcium oxide, of from 10 to 80 percent of the total adsorbent; and,
   C. removing the remainder of said hydrogen sulfide from said fluid by passing said fluid through an adsorbent active for removing hydrogen sulfide therefrom.

7. A process, as defined in claim 6, in which said solid chloride adsorbent has a surface area in the range of from 20 to 50 m²/gm.

* * * * *